UNITED STATES PATENT OFFICE.

ARNO BEHR, OF JERSEY CITY, NEW JERSEY.

METHOD OF REFINING GRAPE-SUGAR.

SPECIFICATION forming part of Letters Patent No. 250,334, dated December 6, 1881.

Application filed October 21, 1881. (No specimens.)

*To all whom it may concern:*

Be it known that I, ARNO BEHR, of Jersey City, New Jersey, have invented a certain Method of Refining Grape-Sugar, of which the following is a specification.

Crystallized grape-sugar as heretofore produced from a watery solution consists of the hydrate of grape-sugar, containing in its pure state 9.09 per cent. of water in chemical combination. This water is called "water of crystallization." The crystallized hydrate of grape-sugar loses this water of crystallization if exposed to a temperature of from 160° to 212° Fahrenheit. In form the crystallized hydrate is composed of spherical aggregations of minute tablets.

It has been known that crystallized anhydride of grape-sugar may be produced by dissolving grape-sugar in strong alcohol and crystallizing it from this solution. The anhydride is distinguishable from the hydrate, first, by its crystalline form, which is that of needles or prisms, and, secondly, by the absence of water of crystallization. When the anhydride is pure, if it be exposed to a temperature of from 160° to 212° Fahrenheit, it will not lose in weight, while, as has been observed, the hydrate, under similar circumstances, loses about nine per cent. of its weight.

It is the object of my invention to produce crystallized anhydrous grape-sugar, or, in other words, crystallized anhydride of grape-sugar, from a watery solution; and my invention is based upon my discovery of certain conditions of concentration and temperature under which a watery solution of ordinary commercial grape-sugar of fair purity—say eighty-five parts of pure grape-sugar to one hundred parts of dry substance—can be made to deposit crystallized anhydride of grape-sugar by mixing with it a small quantity of crystallized anhydride of grape-sugar previously prepared.

In detail, my process consists in forming a watery solution of ordinary commercial grape-sugar, containing only about fifteen per cent. of water. This solution is prepared at, or heated to, a temperature of from 140° to 180° Fahrenheit, and there is stirred into it a minute quantity, say, one hundredth of one per cent. of previously-prepared finely-divided anhydride of grape-sugar. The hot mass is then deposited in molds, in which it may be allowed to rapidly cool down to about 100° Fahrenheit, from which point it is slowly cooled to about 85° Fahrenheit, the time occupied in the slow cooling being from two to three days, or until the contents of the molds are thoroughly crystallized. The object of the slow cooling is to prevent the mass from acquiring a viscous condition. The slow cooling gives time for the formation of crystals, and as the crystals form the remaining sirup diffused through the mass becomes more dilute and fluid. After crystallization, preferably by means of a centrifugal machine, the liquid is drained from the mass of crystals, and thereby the larger portion of the liquid impurities are removed. The resulting product will be found upon examination to be crystallized anhydride of grape-sugar. This product may be washed with water or with a solution of pure grape-sugar, but even without washing will be found to be greatly improved in purity and taste as compared with the original mass.

In this refining process it is necessary to exclude all traces of crystallized hydrate of grape-sugar, otherwise a mixed crystallization will take place and the object of the process be frustrated.

In refining grape-sugar by forming a crystallized hydrate it is necessary to arrest the process of crystallization before completion in order that there may remain in the crystallized mass interstices sufficiently large to permit the expulsion of the molasses or liquid impurities; but owing to the nature of anhydride of grape-sugar, especially the shape of its crystals, the process of crystallization may be allowed to complete itself. The process of crystallization need not be arrested, because as the anhydride crystals are in the form of needles and prisms their aggregation does not prevent the existence of interstices large enough to permit the effectual expulsion of the molasses or liquid impurities from the mass.

It will thus be seen that by my process of refining grape-sugar by forming the crystallized anhydride I am enabled to obtain a larger yield of crystals from a given quantity of grape-sugar than can be obtained by forming therefrom the crystallized hydrate.

I do not claim, broadly, the employment of previously-prepared crystallized sugar for facilitating the crystallization of a sugar solution, as my invention is limited to the use of crystallized anhydride of grape-sugar in a watery solution of grape-sugar under the conditions of concentration and temperature which I have described.

I claim as my invention—

The method of refining grape-sugar herein described, which consists in forming a hot solution of ordinary commercial grape-sugar containing only about fifteen per cent. of water, and in stirring into such solution a minute quantity of finely-divided crystallized anhydride of grape-sugar previously prepared, and in then depositing the hot mass in molds and allowing it to rapidly cool to about 100° Fahrenheit, and thereafter cooling it slowly, maintaining it at a temperature between 100° and 85° Fahrenheit for from two to three days, or until thorough crystallization has taken place, after which the resulting hard mass of crystals is drained, preferably in a centrifugal machine, and thereby the molasses or liquid impurities are expelled.

ARNO BEHR.

Witnesses:
ASA FARR,
M. L. ADAMS.